(No Model.)  2 Sheets—Sheet 1.

J. A. LEWIS.
POTATO DIGGER.

No. 409,293.  Patented Aug. 20, 1889.

Witnesses  
Will F. Norton  
A. C. Rawlings

Inventor  
James A. Lewis  
by John J. Halsted & Son  
his Attys.

(No Model.) 2 Sheets—Sheet 2.

J. A. LEWIS.
POTATO DIGGER.

No. 409,293. Patented Aug. 20, 1889.

Witnesses.
Wm. T. Norton
A. E. Rawlings

Inventor
James A. Lewis
by John J. Halsted & Son
his Att'ys.

UNITED STATES PATENT OFFICE.

JAMES ARTHUR LEWIS, OF HASSALL, NEAR SANDBACH, ASSIGNOR TO POWELL BROTHERS & WHITAKER, OF WREXHAM, ENGLAND.

POTATO-DIGGER.

SPECIFICATION forming part of Letters Patent No. 409,293, dated August 20, 1889.

Application filed January 30, 1889. Serial No. 298,101. (No model.) Patented in England July 8, 1885, No. 8,293.

*To all whom it may concern:*

Be it known that I, JAMES ARTHUR LEWIS, a subject of the Queen of Great Britain, and residing at Hassall, near Sandbach, England, have invented new and useful Improvements in Machines for Digging Potatoes, (for which I have already received a patent in Great Britain, No. 8,293, dated July 8, 1885,) of which the following is a specification.

This invention relates to improvements in machines for digging potatoes; and the invention consists in the employment of two fork-wheels, the axes of which are at an angle to each other. The said axes are adjustable, and the wheels in revolving serve, respectively, to spread the ridge and to separate the potatoes from the soil. The digging-wheel first digs the ridge and the separating-wheel turns the potatoes from the soil. I construct the digging-wheel (which is attached to and operated from the machine in any suitable manner) of a number of iron forks, screwed to the center or boss so that the latter can be fitted with a larger or smaller number of forks, which are set at an angle forward of about thirty degrees. The separating-wheel (which is also attached to and operated from the machine in any suitable manner) is constructed of a number of wooden prongs screwed to an iron center, and when the machine is working finishes the work of the digging-wheel.

In order to enable my invention to be fully understood, I will proceed to describe the same by reference to the accompanying drawings, in which—

Figure 1:
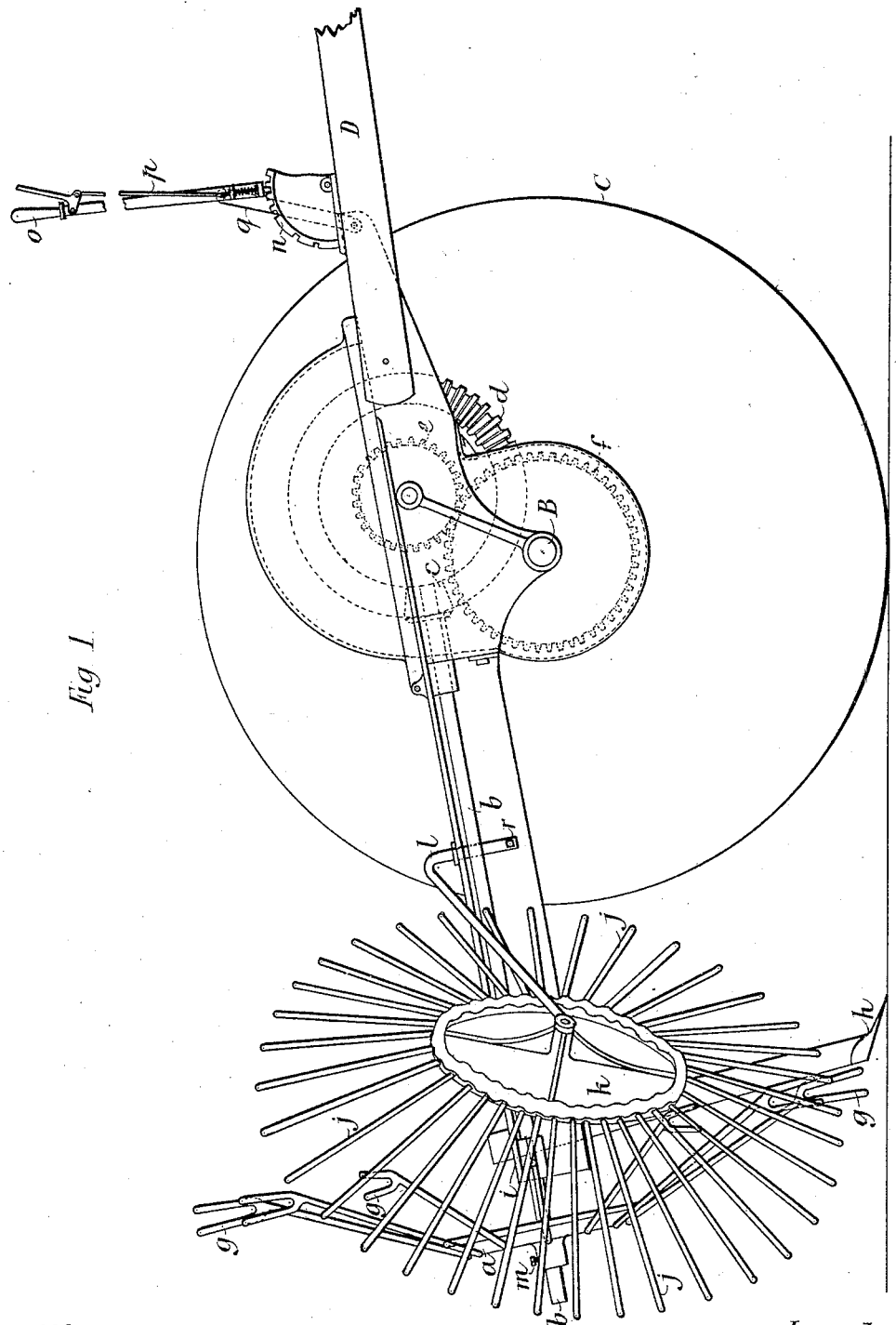
Figure 2:
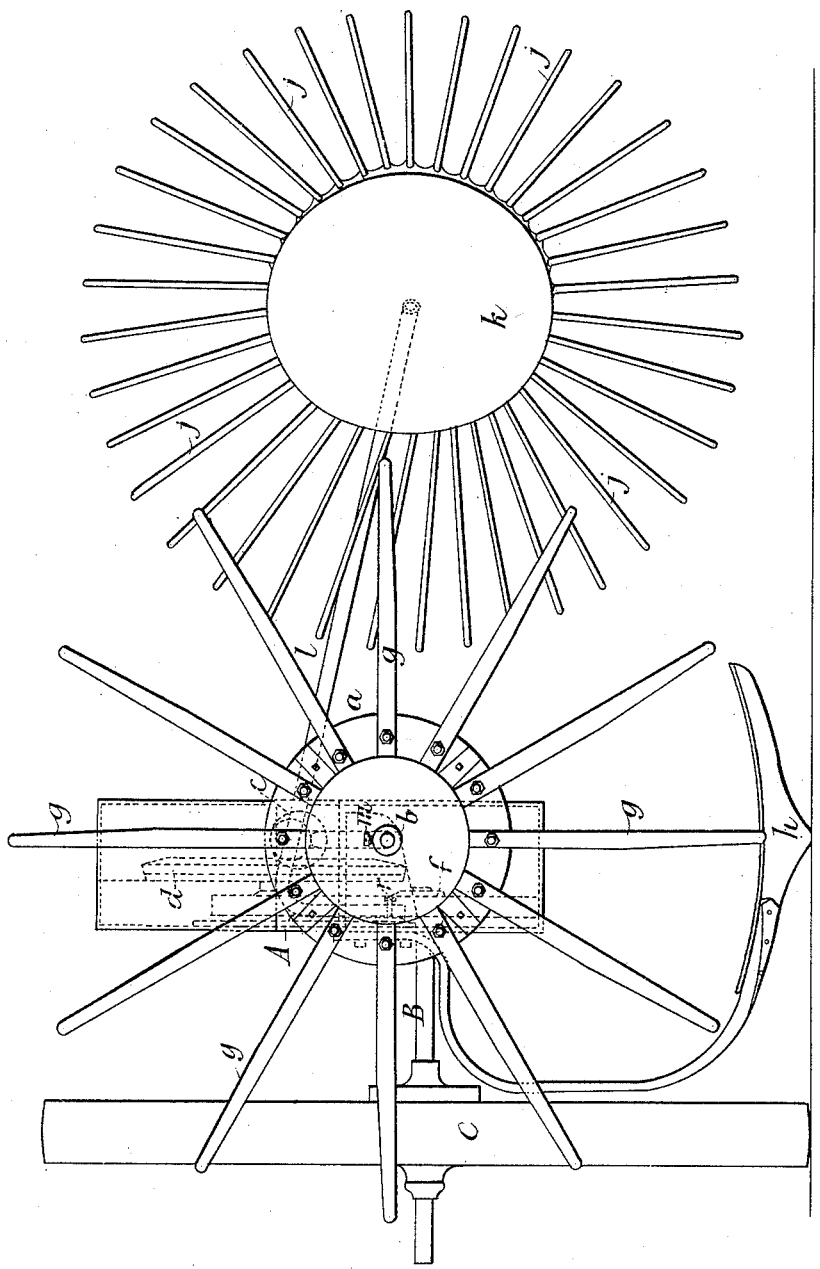

Figure 1 represents a sectional side elevation, and Fig. 2 a back elevation, of a machine for digging potatoes constructed according to my invention.

Similar letters in both the figures are used to indicate similar parts.

$a$ is the center or boss of the digging-wheel, attached to a shaft $b$, the other end of which carries a bevel-pinion $c$, gearing with a bevel-wheel $d$, revolving in the frame A of the machine and driven by a toothed wheel $e$, which is engaged with another toothed wheel $f$, fixed on the shaft B of the traveling wheels of the machine, one of which is shown at C.

$g\ g\ g$ are the iron forks of the digging-wheel, which are screwed to the center or boss $a$, so that it can be fitted with a larger or smaller number of forks, according to the nature of the soil, and which are set at an angle forward of about thirty degrees, as shown in Fig. 1, so as to obtain an under-cut as the ridge falls onto them from the share $h$, attached to the frame of the machine at $i$, thereby requiring less power to operate the machine.

$j\ j\ j$ represent the wooden prongs of which the separating-wheel is constructed, and $k$ is the iron center to which the prongs $j$ are screwed at an angle backward of about thirty degrees to the center $k$ of the wheel, the axis of which is at an angle to that of the digging-wheel $a\ g$.

$l$ is a wrought-iron stay, fixed to the frame A of the machine and serving to support the separating-wheel $j\ k$.

$m$ is a set-screw for fixing the boss of the digging-wheel to the shaft $b$, and whereby the position of the digging-wheel can be adjusted relatively to the share $h$.

$r$ is a set-screw at the inner end of the stay $l$, bearing against the frame A and serving to adjust the height of the wheel $k$ from the ground; or the adjustment can be effected by other suitable means.

D represents one of the shafts of the machine, which carries a toothed quadrant $n$ for regulating the height from the ground of the digging apparatus by means of a hand-lever $o$, spring-rod $p$, and link $q$, attached to the said lever and to the frame A of the machine.

The operation is as follows: The machine is drawn along by means of its shafts D, and the traveling wheel or wheels C will communicate motion to the gearing $e\ f$ and $c\ d$, and through the shaft $b$ the digging-wheel $a\ g$ will be rotated, the share $h$ will turn up the ground, and the forks $g$ of the digging-wheel will spread the ridge. The separating-wheel $j\ k$ is driven round by the weight of the soil and potatoes, which are lifted against it by the digging-wheel $a\ g$. The potatoes are turned over behind the machine and separated from the soil by the separating-wheel without being suddenly stopped and bruised, and they are prevented from falling with the loose soil and are left on the ground in a more convenient position for picking them up.

Having now particularly described and ascertained the nature of my said invention and in what manner the same is to be performed, I declare that what I claim is—

In a machine for digging potatoes, the combination, with a share, of a pronged separating-wheel, and a digging-wheel adjustable relatively to the separating-wheel and provided with a series of terminal forks, these wheels being arranged with their axes at an angle to each other and to the same vertical plane, as shown, to spread the ridge made by the share and also to separate the potatoes from the soil, substantially as hereinbefore described.

JAMES ARTHUR LEWIS.

Witnesses:
 EDWIN HARRISON,
 *The Priory, Wrexham, Accountant.*
 C. RATHBONE JONES,
 *The Priory, Wrexham, Solicitor's Clerk.*